Sept. 3, 1946.  R. T. RELF  2,406,852

CONDUCTOR GROMMET ASSEMBLY

Filed Oct. 5, 1942

INVENTOR.
REGINALD T. RELF
BY
James N. Curtin
ATTORNEY

Patented Sept. 3, 1946

2,406,852

UNITED STATES PATENT OFFICE 2,406,852

CONDUCTOR GROMMET ASSEMBLY

Reginald T. Relf, Chatham, N. J., assignor to Federal Telephone and Radio Corporation, a corporation of Delaware Application October 5, 1942, Serial No. 460,895

4 Claims. (Cl. 174—153)

This invention relates to an elastic grommet assembly for supporting an electric conductor passing transversely through a sheet of metal or other material.

Some of the objects of the present invention are to improve the strength of an assembly of the kind referred to; to equalize the characteristics of the assembly as viewed from either side of the supporting sheet; and generally to provide an improved assembly of the kind referred to, of simple and low cost construction and having improved strength, durability and effectiveness for holding the conductor in place and protecting it or any insulation thereon from injury.

In accordance with one aspect of the present invention a conductor extending through a rubber-like grommet positioned in a metal or other plate, is held fast to the plate by pressure exerted by the grommet on the conductor as a result of pressure of a clamping ring at each end of the grommet.

These and other objects and features of the invention will be apparent from the following detailed description of a modification illustrating an example of the invention in connection with the accompanying drawing and the appended claims.

Figure 1:
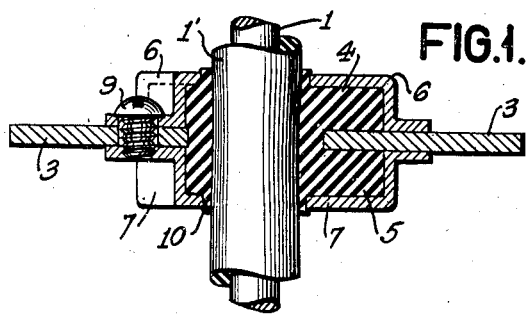
Fig. 1 is an enlarged sectional view of a conductor grommet assembly with a supporting plate, the section being axial to the conductor.

In Fig. 1, a conductor 1 shown as insulated with rubber or other elastic material 1', which may be a flexible insulated conductor or cable of any suitable type, or a bare wire extends through the hole 2, in the sheet, plate, or panel 3, ordinarily of rigid metal but of any other suitable material. A grommet 4 of rubber-like material or other suitable elastic material fitting closely in the hole 2, extends through the plate 3, and has a generally circular flange 5 at each end thereof, coaxial with the hole 4' of the grommet, the inner face of each flange 5, being flush with a respective one of the opposite sides of plate 3. A separate cup-shaped cover or ring 6 and 7, is provided at each respective end of grommet for contacting with the outer face and periphery of each flange 5. A plurality of equally spaced holes 8, distributed around rings 6, 7, near the periphery thereof, and clearance holes 8' in plate 3, serve as screw holes for screws 9, which may have a clearance fit in ring 6, and a screw-threaded fit in ring 7, to enable rings 6 and 7 to be drawn together by tightening of the screws, so that each ring presses the flange 5, housed therein, into close contact with plate 3 and conductor 1.

Figure 3:
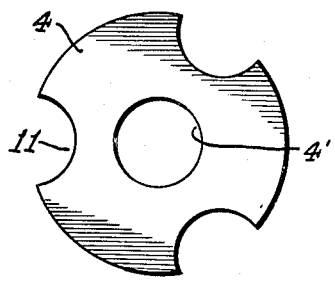
Fig. 3 is an end view of the conductor grommet of Fig. 1.
Figure 2:
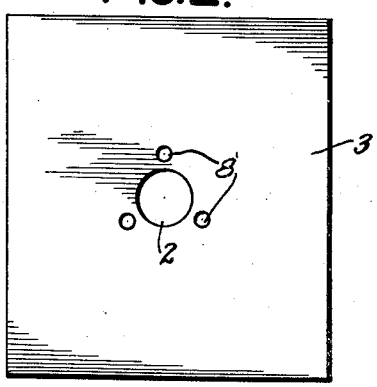
Fig. 2 is a plan view of the supporting plate of Fig. 1.
Figure 4:
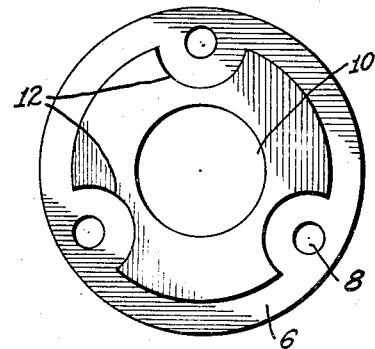
Fig. 4 is an inner face view of one of the ring clamps of Fig. 1.

The hole 10, in each ring 6, 7, is of sufficiently larger diameter than conductor 1 to allow limited movement of conductor 1, when subjected to lateral displacement without permitting contact of the conductor or its insulation, with ring 6 or 7 to cause abrasion or other injury to the conductor or the insulation thereof. Fig. 3 shows the equally spaced arc-shaped indentations 11, corresponding in position and shape with the bosses 12, on the radially inner sides of each ring 6, and 7 from holes 8.

The radius of flanges 5 is large in respect to that of hole 2, and the respective flanges are quite thick in respect to the thickness of plate 3 and when uncompressed, much thicker than the depth of the cup-shaped rings 6 and 7. Recesses 11 are formed so that the deepest part thereof almost reaches the edges of hole 2 when the grommet is in position.

By virtue of the recesses in the edges of the flanges it is possible to insert a large grommet of the described proportions into a relatively small opening, one radial section of the grommet being inserted at a time through the hole.

Figure 5:
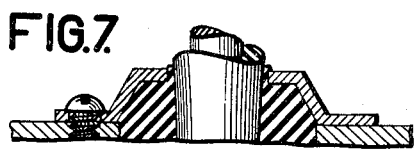
Fig. 5 is a cross-section of a grommet.

The flanges 5 are formed so that the space therebetween is preferably less than the thickness of plate 3 as shown in Fig. 5.

When a grommet of the described proportions is inserted into hole 2, the hole is closed except for the central opening in the grommet. With the insertion of insulated conductor 1—1', the grommet is compressed against the sides of hole 2, the assembly being substantially splash proof, but for the openings in plate 3 for screws 9. Since the space between the flanges 5 is less than the thickness of plate 3, the mid-portion of the grommet is stretched around the area of the plate adjacent to hole 2 which tends to make the outer part of the flanges flare away somewhat from the surface of plate 3.

The flanges 5 are shaped to correspond to that of the cavities between bosses 12 on the undersurface of rings 6 and 7, the flange proportions, however being generally larger than those of the corresponding parts of the rings so that the flanges will be compressed wherever engaged by the rings when the latter are finally positioned by screws 9. Compression of the grommet is aided by locating screws 9 in bosses 12 which brings the effective pressure areas well within the outer edges of flange 5. Since the entire outer edge of the flange is supported either by the cylindrical portions of caps 6 and 7 or the surface of the bosses 12 as the screws are being tightened, the grommet is compressed about its central opening, securely gripping the conductor passing therethrough and completely filling the opening 10 as shown in Fig. 1 to provide a cushion to protect the conductor from lateral stresses.

The symmetrical arrangement of the two flanges 5, 5 and the pressure applying rings 6, 7, coaxially of grommet 4, equalize the holding force which may be exerted on conductor 1 when the force tending to displace the conductor is exerted from either side of sheet 3. The elastic grommet and its assembly are such as to protect the conductor 1 and the insulation thereof in an improved manner over that of grommet assemblies wherein the gripping action takes place on one side only of the panel supporting the conductor. The construction of the assembly is relatively simple and of low cost.

Figure 6:
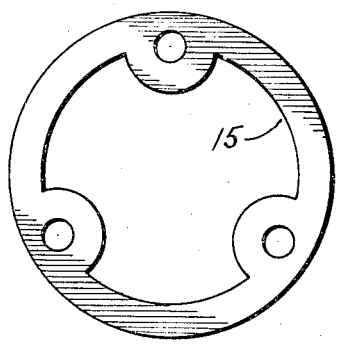
Fig. 6 is a gasket, for use in certain applications of the invention.

The arrangement just described has been found to be particularly strong and serviceable in maintaining a fixed position and support for a conductor or cable passing through a plate, or the like, and incidentally the arrangement is substantially waterproof. The arrangement may be made waterproof by inserting gaskets 15, Fig. 6 between caps 6 and 7 and the surfaces of plate 3, any suitable means being used to waterproof the screwholes.

Figure 7:
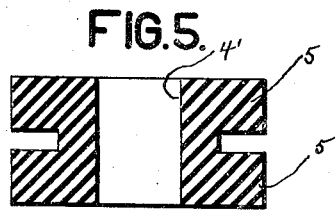
Fig. 7 shows a modification of the invention.

The invention may be modified in various ways, for example, according to the embodiment shown in Fig. 7 where the cap 16 having tapered sides may be used as described above with a grommet of the general shape of that shown in Figs. 1 and 3.

Various modifications of the assembly described above, will be apparent to those skilled in the art without departing from the broad aspects of the invention as set forth in the appended claims.

What is claimed is:

1. A grommet assembly for supporting an electric conductor passing through a hole in a plate comprising a grommet of elastic material formed with radial flange portions for positioning at opposite sides of the plate and at least one of said flanges having a plurality of indentions formed in the edges thereof to aid in inserting said grommet in said hole, and said grommet having an axially disposed opening adapted to fit closely a conductor extending therethrough, a cup-shaped ring disposed over at least one of said flanges and having an aperture of lesser diameter than that of the plate aperture and spaced from the conductor, a plurality of screws extending through the plate and connecting said ring to the plate, said grommet and ring being relatively proportioned whereby upon securing of the ring to the plate the material of the grommet will be deformed to exert a compressive force on the conductor and said ring being formed with internal bosses which enter the indentations in the edge of the grommet flange.

2. A grommet assembly for supporting an electric conductor passing through a hole in a plate comprising an elastic grommet, a flange at each end of said grommet having a plurality of indentations formed in the edges thereof to aid in the inserting of the grommet in said hole, an axially disposed opening in said grommet adapted to receive closely a conductor extended therethrough, a cup-shaped ring disposed over each flange and having an aperture in spaced relation to the conductor and of lesser diameter than that of the plate aperture, a plurality of screws extended through said plate and connecting said cup-shaped rings for clamping said flanges with a compressive force, and said cup-shaped rings being formed with internal bosses which enter the indentations in the edges of said flanges.

3. A grommet assembly according to claim 2, having openings for the screws disposed in said ring bosses whereby the pressure of said screws is exerted through said cup-shaped rings on the flat surfaces of said flanges.

4. A grommet assembly for supporting an electric conductor passing through an aperture in a plate comprising a grommet of elastic material formed with radial flange portions for positioning on opposite sides of the plate, said grommet having a central aperture for the reception of the conductor and having at least one of its flange portions formed with indentations to facilitate assembling with the plate and a clamping member for the grommet adapted to be secured to the plate, said clamping member being formed with internal bosses which enter the indentations of the grommet flange to substantially fill the spaces thereof.

REGINALD T. RELF.